United States Patent
Doi

(12) 
(10) Patent No.: US 6,542,811 B2
(45) Date of Patent: Apr. 1, 2003

(54) WALKER NAVIGATION SYSTEM, WALKER NAVIGATION METHOD, GUIDANCE DATA COLLECTION APPARATUS AND GUIDANCE DATA COLLECTION METHOD

(75) Inventor: Miwako Doi, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 10/013,657

(22) Filed: Dec. 13, 2001

(65) Prior Publication Data

US 2002/0077749 A1 Jun. 20, 2002

(30) Foreign Application Priority Data

Dec. 15, 2000 (JP) .......................................... 2000-382494

(51) Int. Cl.⁷ .............................................. G01C 21/26
(52) U.S. Cl. ........................ 701/200; 701/200; 701/209; 701/211
(58) Field of Search ................................ 701/200, 209, 701/211, 23, 28; 340/944

(56) References Cited

U.S. PATENT DOCUMENTS

| | | | | |
|---|---|---|---|---|
| 5,842,145 A | * | 11/1998 | Zimmer | 701/201 |
| 6,188,957 B1 | * | 2/2001 | Bechtolsheim et al. | 701/209 |
| 6,374,182 B2 | * | 4/2002 | Bechtolsheim et al. | 701/209 |

* cited by examiner

*Primary Examiner*—Yonel Beaulieu
(74) *Attorney, Agent, or Firm*—Oblon, Spivak, McClelland, Maier & Neustadt, P.C.

(57) ABSTRACT

A walker navigation apparatus, including an input designation device to input a departure location and destination; a road data storage unit to store road data; a supplemental data storage unit to store supplemental data representing at least one of stairs, an elevator, an escalator, a step, and a road width corresponding to the road data; a route generator to generate an optimum route by calculating a cost of a route from the departure location to the destination based on the road data and the supplement data; and an output device to visually output the optimum route.

20 Claims, 10 Drawing Sheets

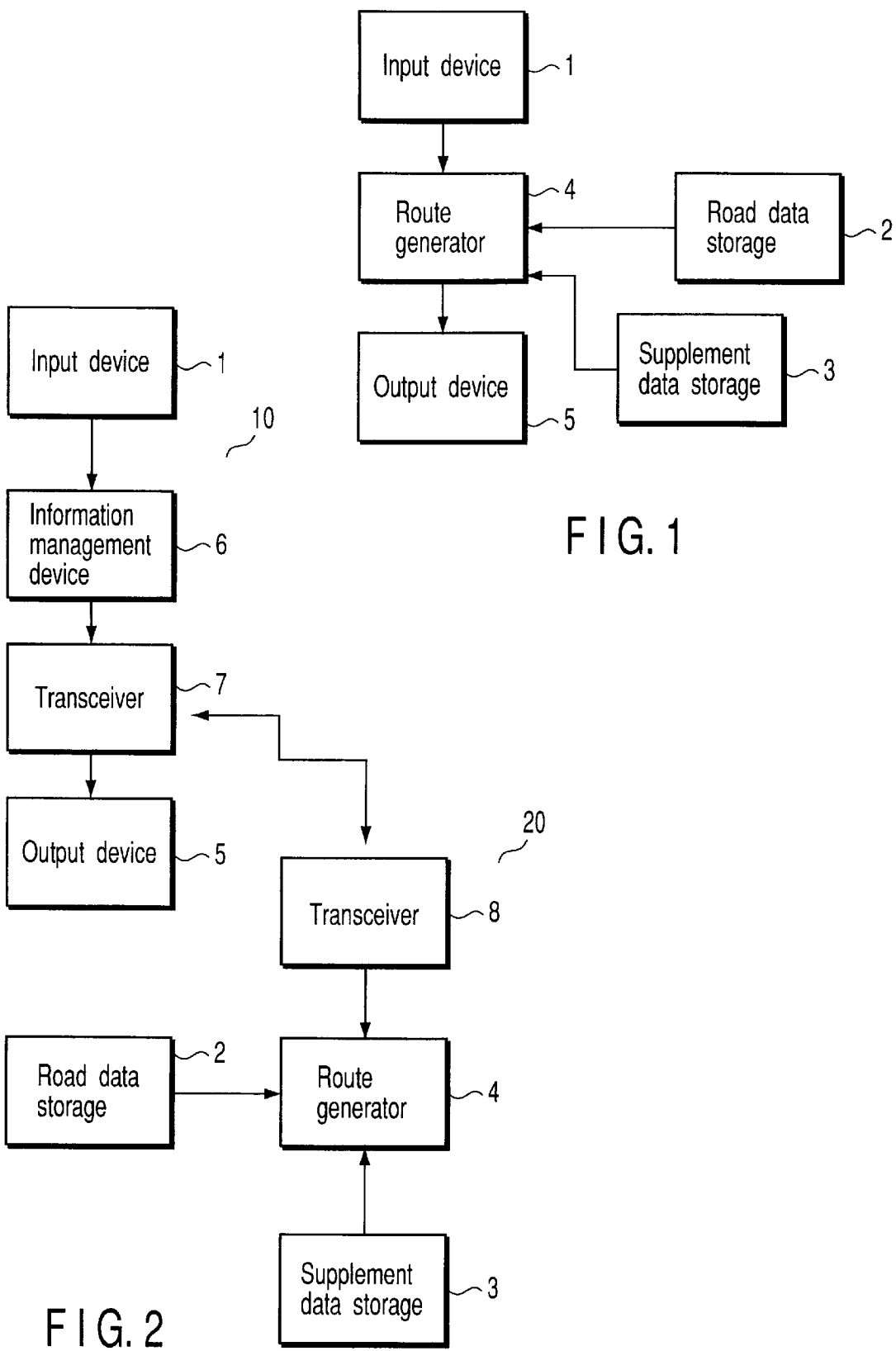

Please input departure location and destination

Departure

Station name, landmark name

Address

Destination

Station name, landmark name

Address

OK    Cancel

FIG. 4

What kind of route will be preferable ?
☐ There is an elevator
☐ There are a few steps
☐ There is a road width that a wheelchair can pass
☐ There are a few pedestrians
☐ There is illumination and is bright
☐ There are stairs but distant is shortest
☐ There is a raised block

FIG. 5

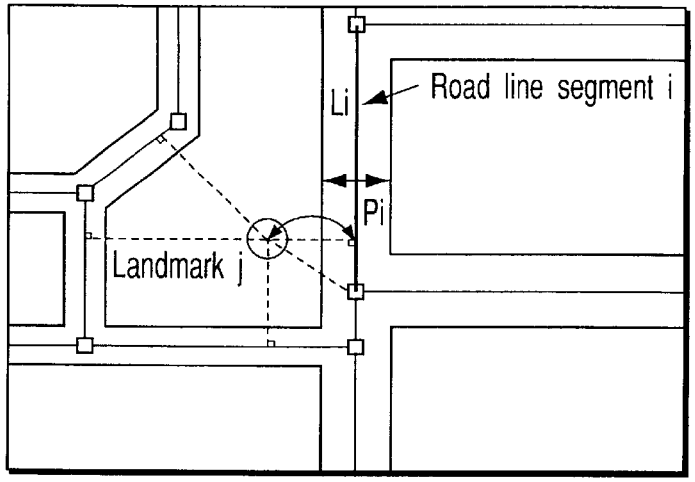

| Node ID | Numeric value |
| Position | (X, Y) |
| Crossing name | Character string |
| Number of arcs to be connected | Numeric value |
| Array of arc IDs to be connected | Numeric value |
| Departure location flag | Numeric value |
| Destination flag | Numeric value |

FIG. 7B

| Road line segment ID | Numeric value |
| Position of start point | (X0, Y0) |
| Position of end point | (X1, Y1) |
| Start point node ID | Numeric value |
| End point node ID | Numeric value |
| Road name | Character string |
| Road width | Numeric value |
| End point left landmark ID | Numeric value |
| End point right landmark ID | Numeric value |
| End point left landmark angle | Numeric value |
| End point right landmark angle | Numeric value |

FIG. 8A

| | |
|---|---|
| Landmark ID | Numeric value |
| Name | Character string |
| Classification | Predetermined numeric value |
| Priority | Numeric value |
| Shape expression | Character string |
| Position | (X, Y) |

FIG. 8B

| Classification | Priority |
|---|---|
| * * * * * * * * * * * * * * * * | |
| Supermarket, convenience store | |
| Bank | 1 |
| Police box | 2 |
| Gas station | 2 |
| Book store | 2 |
| Catering establishment | 3 |
| School | 3 |
| ...... | ...... |
| None | 10 |

FIG. 8C

| Classification | Priority |
|---|---|
| * * * * * * * * * * * * * * * * | |
| Elevator | -1 |
| Escalator | -1 |
| Supermarket, convenience store | 1 |
| Bank | 1 |
| Police box | 2 |
| Gas station | 2 |
| Book store | 2 |
| Catering establishment | 3 |
| School | 3 |
| Stairs | 10 |
| ...... | ...... |

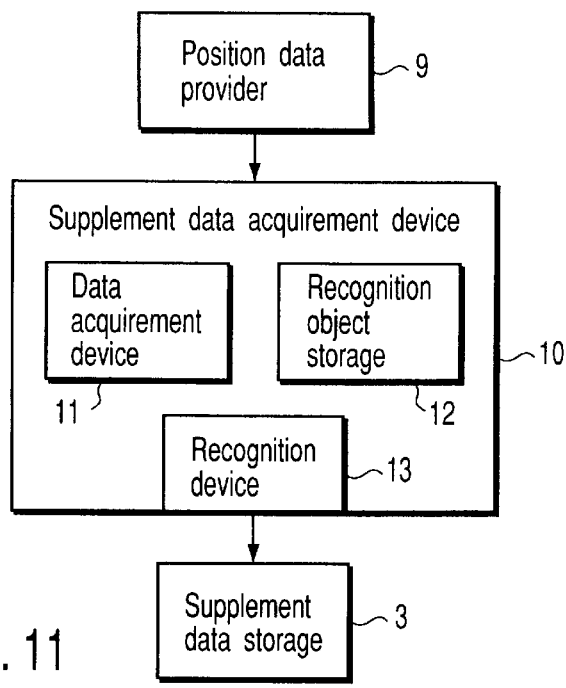
FIG. 11
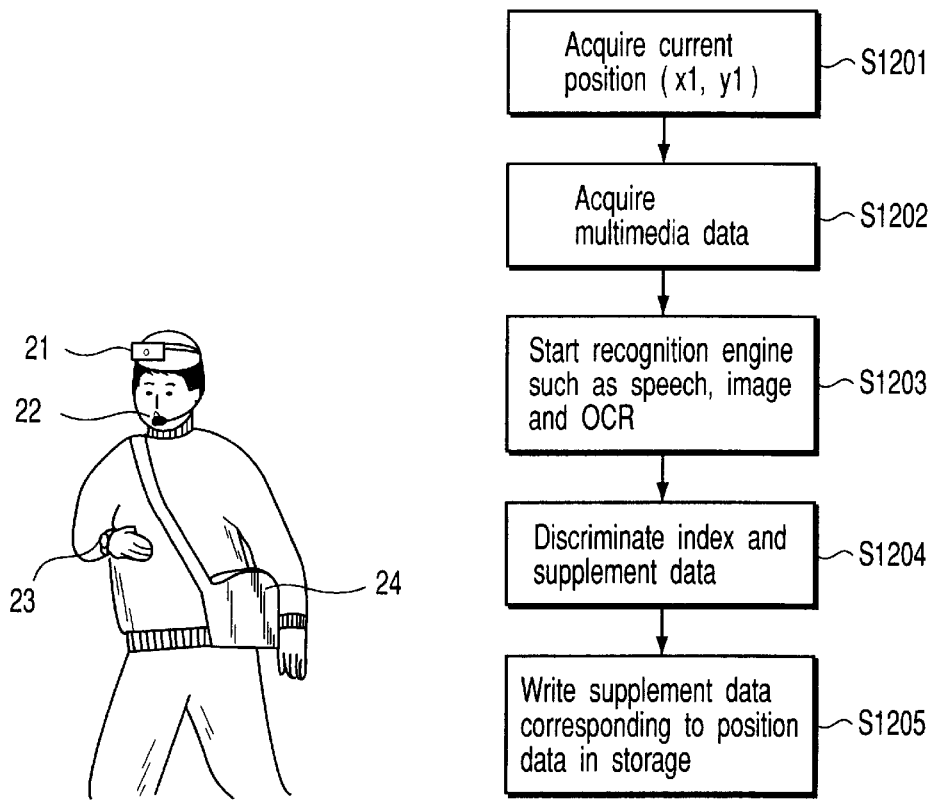
FIG. 12
FIG. 13

```
<smil>
<head>
    <layout>
        <root-layout width="380" height="285" background-color="black"/>
        <!.. Background Region..>
        <region id="back_image" left="0" top="0"
        width="380" height="285" z-index="0"/>
        <!.. Real Text Region..>
        <region id="Real Text" left="10" top="235"
        width="310" height="15" z-index="1"/>
    </layout>
    <!..meta data (representation) ..>
    <date>2000-02-28;15:00</date>              <!.. record day and hour ..>
    <update>2000-02-28;17:00</update>          <!.. update day and hour ..>
    <title-img src="image1.img"/>              <!.. representation image ..>
    <title-text> representation text </title-text>   <!.. representation text ..>
    <schedule src="http://www.eel.toshiba.co.jp/schedule#20000228"/>
</head>
<!..association with synchronization..>
<body>
    <par>
        <seq>
            <img src="picture1.jpg" region="back_image"
            begin="0.0s" dur="10.0s"/>
            <img src="picture2.jpg" region="back_image"
            begin="0.0s" fill="freeze" dur="10.0s"/>
        </seq>
        <textstream src="text.rt" region="Real Text" fill="freeze"/>
        <seq>
            <audio src="sound1.wav" begin="0.0s" dur="10.0s"/> (voiced speech)
            <audio src="sound2.wav" begin="0.0s" dur="10.0s"/> (voiced speech)
        </seq>
        <!..MMDL expansion portion..>
        <pulsestream src="pulse.1w"/>
        <shape src="shape.shp#1" begin="0.0s" dur="20.0s"/>
        <shape src="shape.shp#2" begin="10.0s" dur="10.0s"/>
        <gpsstream src="position.gps" begin="0.0s" dur="5.0s"/> (position data)
    </par>
</body>
<!..meta knowledge expression..>
<recg
    xmlns:rdf="http://www.w3.org/1999/02/22-rdf-syntax-ns#"
    xmlns:s="http://description.toshiba.co.jp/schema/">
    <rdf:RDF>
        <!..speech before conversion..>
        <rdf:Description about="sound1.wav">
            <!..result of speech recognition..>
            <s:Rspr> elevator </s:Rsp>
        </rdf:Description>
        </rdf:Description>
    </rdf:RDF>
</recg>
</smil>
```

FIG. 14

| | |
|---|---|
| Landmark ID | Numeric value |
| Name | Character string |
| Classification | Predetermined numeric value |
| Priority | Numeric value |
| Shape expression | Character string |
| Position | (X, Y) |
| Point to multimedia data | p |

| | |
|---|---|
| Landmark ID | |
| Name | Elevator |
| Classification | EL |
| Priority | -1 |
| Shape expression | □ |
| Position | (X1, Y1) |
| Point to multimedia data | p1 |

WALKER NAVIGATION SYSTEM, WALKER NAVIGATION METHOD, GUIDANCE DATA COLLECTION APPARATUS AND GUIDANCE DATA COLLECTION METHOD

CROSS-REFERENCE TO RELATED APPLICATIONS

This application is based upon and claims the benefit of priority from the prior Japanese Patent Application No. 2000-382494, filed Dec. 15, 2000, the entire contents of which are incorporated herein by reference.

BACKGROUND OF THE INVENTION

1. Field of the Invention

The present invention relates to (1) a walker navigation system for use by a walker such as a senior citizen, a parent with a baby carriage, or a person in a wheelchair using an elevator or an escalator, rather than steps or stairs; (2) a walker navigation method; (3) a guidance data collection apparatus that collects information for use in guidance; and (4) a guidance data collection method.

2. Description of the Related Art

The mobile dedicated terminal which provides with a GPS (Global Positioning Service) receiver and a position data function of PHS is commercial available. The mobile dedicated terminal is used for providing service such as deliver of a map based on position data or town information. The service that the user enjoys a route guidance by designating a departure location and a destination without having such position data has come to be performed by a PC or a cellular phone. These guidance services include a service in which a course to be guided is manually set beforehand. However, such service locations a limit on a range that can be guided.

In contrast, there is a route guidance service generating automatically a guidance route based on a road network that the Geographical Survey Institute provides or a private house map. The road network comprises a line representing a road connecting between crossings, but includes no concept such as a road width. In order to supplement this, a route automatic generation system is developed which calculates the road width using the private house map and so on, and automatically generates plural routes coupling a departure location and a destination using the road network. This system is so constructed as to select from the plural routes a route that seems to be most easy to find in a user by the road width extracted from the house map.

A conventional guidance cannot lead a route suitable for following users.

1) A user such as senior citizens who are of trouble waking and want to use an elevator and an escalator rather than stairs 2) A user using a baby carriage or a wheelchair who wants to use a sidewalk without a step, an elevator or an escalator.

3) A user carrying a big load which wanted to use a sidewalk without a step, an elevator, or an escalator.

4) A user who wants to use a road through which the user can pass with a safe conscience even if it is an indirect road, without a road which is narrow in a road width due to parking of many cars and bicycles, and cannot pass a wheelchair, 5) A user who wants to use a road illuminated by many streetlights in the night.

According to current guidance systems, when a departure point and a destination point are designated by a user, only one route is provided. Suppose, for example, that a senior citizen cannot use the stairs (in particular, going down) due to pain caused by trouble walking. Accordingly, he or she wants to use an escalator or an elevator. Moreover, a person who takes an infant and goes out with a baby carriage, or a person using a wheelchair, cannot pass a step between a crosswalk and a sidewalk. Furthermore, since he or she cannot take stairs or an escalator, he or she wants to use an elevator, if possible. Also, a person carrying a large load wants to use an escalator or an elevator instead of stairs. Even if there is no step, when the road width becomes narrow due to the parking of many cars and bicycles, a person with a large load or a wheelchair cannot pass through the narrow road. Such a road presents problems in front of a station where many bicycles are used for attending office/attending school, or during the weekend shopping rush.

A visiting nurse or a carer which needs to visit a new residential area without distinction of the night and day wants to pass on the bright road provided with streetlights that can walk with a safe conscience in the night. As thus described, some persons have various demands to want to take advantage of the road where there is no step and road width is ensured, even if made a detour to some extent and to use an escalator or an elevator as possible.

Since no route guidance service has been provided so far, the user has satisfied with a mere route guidance. It is demanded that guidance along hope of a user is performed as well as that the guidance is merely available. In other words, there is demanded a system that a user can enjoy a desired route guidance by not only inputting a departure location and a destination but also designating whether it is a guidance in the night, a guidance to give priority to the use of an escalator or an elevator or a guidance including no step. As a result, satisfaction degree of the user is improved. However, in a conventional guidance, the means for inputting a demand of the user is not prepared.

Supplement information such as an elevator, an escalator, stairs, and a step had to be collected for the purpose of providing such a guidance. In addition to supplement data, landmarks such as a convenience store or a bank becoming a mark are manually collected under the present conditions. This collection is terrible, and data are not readily updated, so that the route must be guided by information before two or three years. Furthermore, the system cannot cope with the intense location of relocationment of a store such as a convenience store or a hamburger shop. Besides, temporary road information of the locations where a walk is impossible under construction cannot be collected.

In such data collection, there are problems that a person must go to the actual location really to confirm present conditions, that a man power is required for digitizing collected data, and that an input mistake occurs. If data collected by a person going to the actual location really can be digitized in real time, large shortening of collection time and drastic reduction of an input mistake may be realized.

In the prior art, there is no guidance that accepted a demand of a user such that the user can walk on a road provided with many streetlights or a road having no step if possible, and can use an elevator or an escalator if possible. A collection apparatus capable of collecting landmarks and supplement data such as an elevator, an escalator, stairs and a step and digitizing the collected data at the location is demanded.

BRIEF SUMMARY OF THE INVENTION

According to an aspect of the present invention, there is provided a walker navigation system comprising: an input designation device configured to input a departure location and destination of guidance; a road data storage configured to store road data; a supplement data storage configured to store supplement data representing at least some of stairs, an elevator, an escalator, a step, and road width in correspondence with the road data of the road data storage; a route generator configured to generate an optimum route by calculating a cost of a route from the departure location to the destination based on the road data stored in the road data storage and the supplement data stored in the supplement data storage; and an output device configured to output the optimum route in a form desired by a user.

BRIEF DESCRIPTION OF THE SEVERAL VIEWS OF THE DRAWING

FIG. 1 shows a block diagram of a walker navigation system related to the first embodiment of the present invention;

FIG. 2 shows a block diagram of a walker navigation system related to the second embodiment of the present invention;

FIG. 4 shows an input screen of a walker navigation system of the first and the second embodiment;

FIG. 5 shows an input screen of a walker navigation system of the first and the second embodiment;

FIG. 6 shows an example of setting a cost to a road line segment i obtained by a walker navigation system of the first and the second embodiments;

FIGS. 7A and 7B show structures of a crossing node and a road line segment in a walker navigation system of the first and the second embodiment;

FIGS. 8A to 8C show structure, default value and priority of landmark data in a walker navigation system of the first and the second embodiment;

FIG. 11 shows a block circuit of guidance data collection apparatus related to the third embodiment;

FIG. 12 shows the appearance of guidance data collection apparatus of the third embodiment;

FIG. 13 shows a flow of a process of guidance data collection apparatus of the third embodiment;

FIG. 14 shows an example of structure of multimedia data acquired in a guidance data collection apparatus of the third embodiment;

Figure 3:
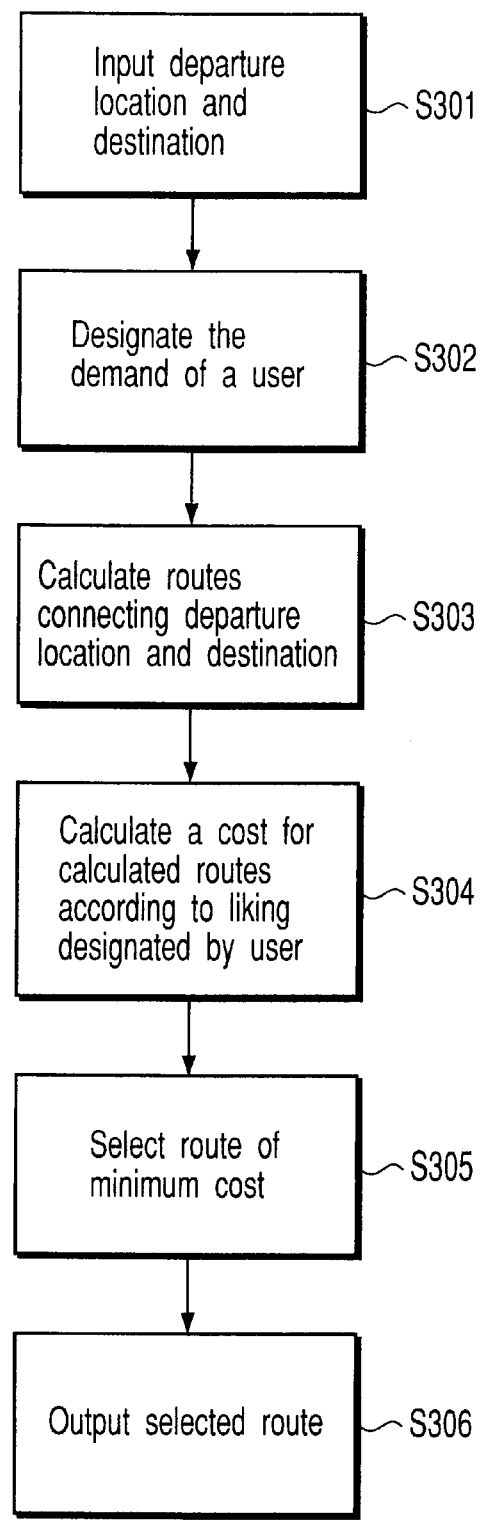
FIG. 3 shows a flow of a process of guidance by a walker navigation system of the first and the second embodiment.

DETAILED DESCRIPTION OF THE INVENTION (First Embodiment)

According to the walker navigation system related to the first embodiment shown in FIG. 1, an input device 1 comprises a position acquisition device such as keyboard or GPS (Global Positioning System). The input device 1 is used for inputting a departure location and a destination or specifying a route that a user hopes such as a route without stairs and a route illuminated by streetlights in the night. A road data storage 2 is provided for storing road network data (data representing a structure that roads are linked with one another) provided by the Geographical Survey Institutes and so on. A supplement data storage 3 stores supplement data in correspondence with stored data of the road data storage 2. The supplement data include data representing stairs, an elevator, an escalator, a step, and road width, and data used as supplement in guidance for a senior citizen, a person with a baby carriage, a person with a wheelchair, a person of trouble walking or a person with pain in the legs.

A route generator 4 is connected to the input device 1, the road data storage 2 and the supplement data storage 3, and computes a route cost on a route leading to a destination from a departure location that is input by the input device 1, on the basis of the road data stored in the road data storage 2 and the supplement data stored in the supplement data storage 3 to obtain an optimum route. An output device 5 outputs a route generated by the route generator 4 in a form that a user is easy to understand, for example, a flashing indication of a route, a colored indication, a color printing of the route or an arrow printed material.

(Second Embodiment)

According to the walker navigation system of the second embodiment shown in FIG. 2, a terminal 10 used by a user and a guidance service server 20 are provided independently. The user terminal 10 includes an information management device 6 and a transceiver 7 as well as an input device 1 and an output device 5 which correspond to the input and output devices of the first embodiment of FIG. 1. The transceiver 7 communicates over a radio public network of cellular phones or a local public network of Bluetooth in order to perform transmission and reception of information between the user terminal 10 and the guidance service server 20. This user terminal 10 may double as a terminal such as the normal cellular phone or PHS (Personal Handyphone System).

Figure 10:
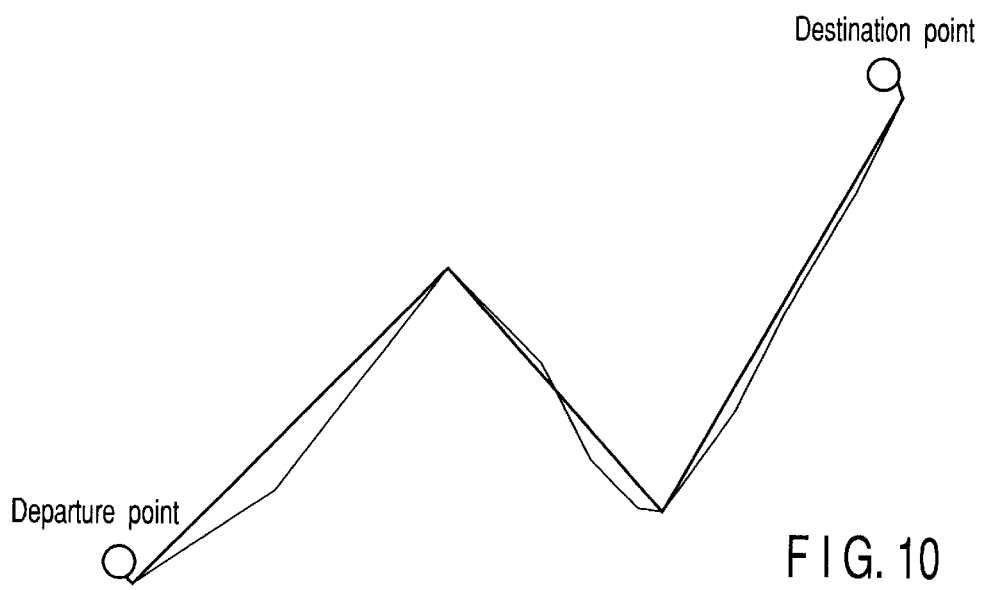
FIG. 10 shows an example of a simplified route provided with a walker navigation system of the first and the second embodiment.

The guidance service server 20 includes a road data storage 2, a supplement data storage 3 and a route generator 4, receives a present location and a destination input by radio by the user terminal 10 through the transceiver 8, and generates a route based on the reception data, that is, current location/destination data in the route generator 4. The guidance service server 20 transmits the generated route in a form of a simple map or a guidance sentence with the simple map and a text (or speech) to the transceiver 7 of the user terminal 10 through the transceiver 8. The user terminal 10 displays the simple map or text on the output device 5 as shown in FIG. 10 on the basis of the transmitted simple map or simple map and text. The transmitted speech or text can be presented by a speech synthesis.

There will now be described an operation of the walker navigation system of the above configuration in conjunction with a flowchart of FIG. 3.

At first, a user inputs a departure location and a destination to a dialogue screen shown in FIG. 4, for example (step S301). In this example, the departure location and destination are input in a form such as a station name (for example, Kawasaki), a landmark name (for example, ○○ bank Kawasaki branch) or an address (for example, XX, Isago, Saiwai-ku, Kawasaki-shi). The input form is not always limited to this. For example, the input of the departure location is unnecessary when the current location of the user is determined as the departure location using a method of specifying a position according to the strength of radio waves from plural base stations by means of a GSP which calculates longitude/latitude by receiving the radio wave from a satellite or a cellular phone and PHS. When precision of the position acquisition is not so high, a method of presenting plural station names or landmarks included in an error range are presented, and selecting at least one among them may be used.

When a destination inputs in the dialogue screen of FIG. 4, a demand (liking) for the route where the user is guided inputs in an input screen shown in FIG. 5, for example (step S302). For example, the user who is a good walker and likes a route to be able to go by the shortest time even if there are stairs to some extent selects "Shortest route even if there are stairs". The same user may designate a route "brightness by illumination" in the night. A user of the senior citizen who is of trouble waking, a user pushing a baby carriage or a user carrying a big suitcase selects "an elevator or an escalator". Since a user in a wheelchair wants a route that the road width is wide or a road width that can easy pass with a wheelchair with a few car and bicycle being parked is secured, such user selects "Road with a width that can pass with a wheelchair". As thus described, a user can designate a fulfill route according to the situation as shown in FIG. 5.

A route generator 4 calculates plural routes connecting the departure location and destination inputted in step S301 (step S303). A cost is calculated for these plural routes according to liking designated by the user in step S302 (step S304). A route is expressed in a network formed of a crossing (a node) and a road line segment (an arc). For example, a route has an ID or IDs to be connected to each other every crossing and every road line segment as shown in FIG. 7. The departure location can be coupled to the destination by threading out the IDs.

A cost $C_i$ of the road line segment i actually designated is determined by a length $d_i$ of the line segment, a road width $P_i$ of the line segment and a distance L1 from a landmark j near the line segment, as shown in FIG. 6. A convenience store or a bank is used as a landmark j usually. The landmark is described with a data format (landmark data structure) shown in FIG. 8A for example. The priority is determined in the order of shops that reputation is easy to be found in the town such as a supermarket, a convenience store or a bank in FIG. 8B showing a priority default value. Supplement data is described with a data format similar to that of the landmark.

When an elevator or an escalator is designated by a user, the elevator and escalator stored as supplement data are treated as the landmark. In an example of the priority changed according to the user's demand as shown in FIG. 8C, the elevator and escalator are considered as the landmark, and the priority of the landmark of the elevator or escalator is advanced. Therefore, a cost of a road line segment i near this landmark decreases. When "No step" is designated, a cost of the road line segment i including a step increases. If a road width is designated, when the. road width $P_i$ of the road line segment i is wide, the cost $C_i$ decreases. In such a procedure, the costs $C_i$ of the road line segments i are calculated according to designation met the demand of the user (step S304).

A route of the minimum cost is calculated based on the costs of individual road line segments i that were calculated as described above (step S305). An algorithm to obtain the route of the minimum cost uses a method of Dijkstra (Dijkstra, E. A., "A note on two problems in connection with graphs", Numerische Math., 1, pp. 269–271). Since the cost of the road line segment i met the user's demand already lowers at this point, a route most met the demand of the user is finally selected. In other words, when the user demands the shortest distance, a route of the most shortest distance is selected. When the user demands the use of an escalator or an elevator, a route including the escalator or elevator is selected, even if the route is distant to some extent.

There will be described the cost calculation based on the route shown in FIG. 9 hereinafter.

It is assumed that the road line segments 101, 102, 103 and 104 are equal in length and road width. It is assumed that a convenience store is located near the crossing of the road line segments 101 and 102, and an escalator is located near the crossing of the road line segments 103 and 104. The cost calculationignoring the cost other than the landmark for simplification is performed as follows.

Figure 9A:
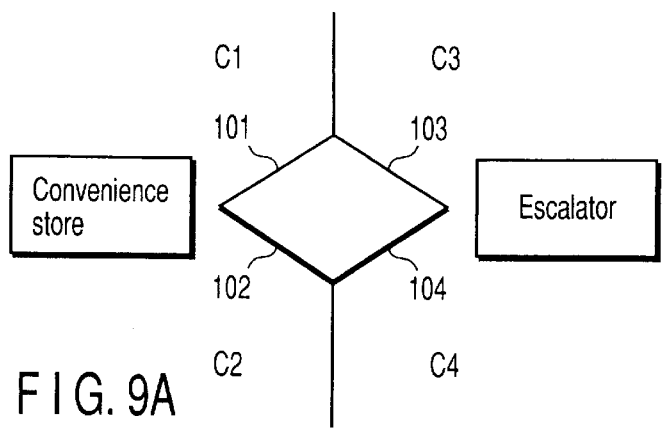
FIGS. 9A to 9C show results of cost calculation with a walker navigation system of the first and the second embodiment.

Since the cost is calculated according to the priority of FIG. 8B usually, the result is $C1+C2=1+1=2$ $C3+C4=10+10=20.$ That is, the cost of the left side route decreases. Therefore, the route on the left side of FIG. 9A is calculated as the most suitable route.

Figure 9B:
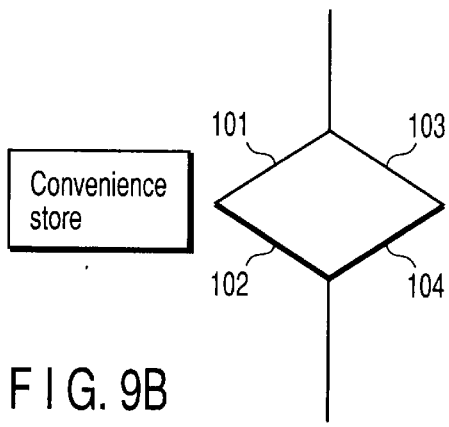
Figure 9C:
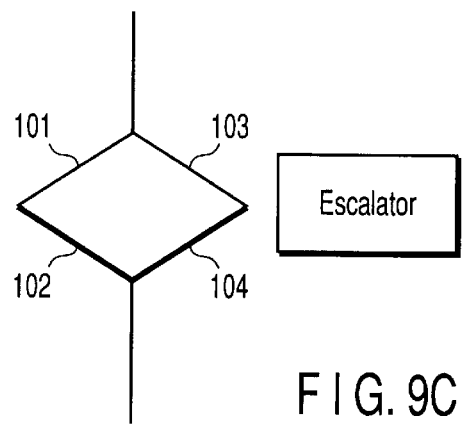

When the user demands the use of an escalator or an elevator by priority, the cost is calculated according to the priority of FIG. 8C. The result is $C1+C2=2$ $C3+C4=-2$ The cost on the right side route decreases. Therefore, the right side route of FIG. 9A is calculated as the optimum route. If the routes were calculated, for the purpose of easy watching the route, the right route where the escalator is located near the crossing is simplified and displayed as shown in FIG. 9B, or the left route where a convenience store is located near the crossing is simplified and displayed as shown in FIG. 9C (step S306). The process of steps S301–S306 is computer-programmed and executed by a computer.

According to the walker navigation system described above, the cost of the road line segment i can be changed by a user selecting a desired route according to the situation. Thus, the route met the demand of the user is selected, so that the walker navigation system provides a high convenience.

(Third Embodiment)

The third embodiment relates to a guidance data collection apparatus to acquire supplement data such as an elevator or an escalator. FIG. 11 shows a schematic configuration of a guidance data collection apparatus. According to this guidance data collection apparatus, a position data provider 9 is provided which specifies a position and outputs position data corresponding to the specified position such as longitude, latitude and so on by GPS, PHS or CDMA-One. The position data obtained by the position data provider 9 and the supplement data obtained by a supplement data acquisition device 10 are stored in the supplement data storage 3 so as to associate with each other.

The supplement data acquisition device 10 comprises an data acquisition device 11 to acquire multimedia data such as a still image, a motion image, a speech, a recognition object storage 12 to store recognition object data to be recognized as supplement data such as an image and a key word, and a recognition device 13 to recognize multimedia data acquired by the data acquisition device 11 and recognition object data stored in the recognition object storage 12.

FIG. 12 shows the supplement data acquisition device 10 attached to an operator. According to this, a head set (data acquisition device 11) comprising a camera 21 to acquire data such as a still image or a motion image and a microphone 22 to input a speech is mounted on the head of an operator. A remote switch 23 performing ON/OFF of information collection is held on a wrist of the operator. The speech input from the microphone 22 and the still image or motion image which is captured by the camera 21 are recognized by the recognition device 13 provided in a personal computer 24 received in a bag, for example. The recognition device 13 recognizes the input speech or the input image on the basis of word or image stored in the recognition object storage 12 which stores key words necessary for recognition of supplement data such as "escalator", "elevator", "stairs", "step", "road width", "wide", "narrow", "illumination" and "congestion".

FIG. 12 shows an appearance designed on the assumption that a volunteer and the like can wear and data necessary for guiding a way of barrier-free is collected. The supplement data acquisition device 10 is not always limited to such appearance. The supplement data acquisition device 10 can collect supplement data with it being mounted on a wheelchair or a baby carriage.

Under the present situation, if the supplement data acquisition device 10 does not have the CPU power of a PC level, it cannot execute speech/image recognition. However, it is expected that the CPU power of a PDA or a cellular phone can be improved or the speech/image recognition can be scaled down so that it can execute even by a lower CPU power. Therefore, the supplement data can be fully collected by devices of size of the present PDA or cellular phone in the future.

FIG. 13 shows a flow of a process in the guidance data collection apparatus related to the present embodiment. There will be described a flow of a process of finding a location on which an elevator is installed and collecting information related thereto in conjunction with FIG. 13.

The current position is acquired with GPS and so on in, for example, latitude and longitude for the purpose of registering the location of the elevator (step S1201). Next, the elevator is captured by a camera, and information of "elevator" is collected with a speech (step S1202). Collected multimedia data is described by XML (extensible Markup Language) corresponding to MPEG-7 (Motion Picture Expert Group Phase 7) for example (FIG. 14). The uttered speech is stored in a WAV file as shown in FIG. 14. Position data also is stored in the WAV file in correspondence with a speech and an image. Recognition is started by the speech recognition (step S1203). As a result, a text of "elevator" in the WAV file is recognized as shown in FIG. 14 (step S1204).

Figures 15A, 15B, 16:
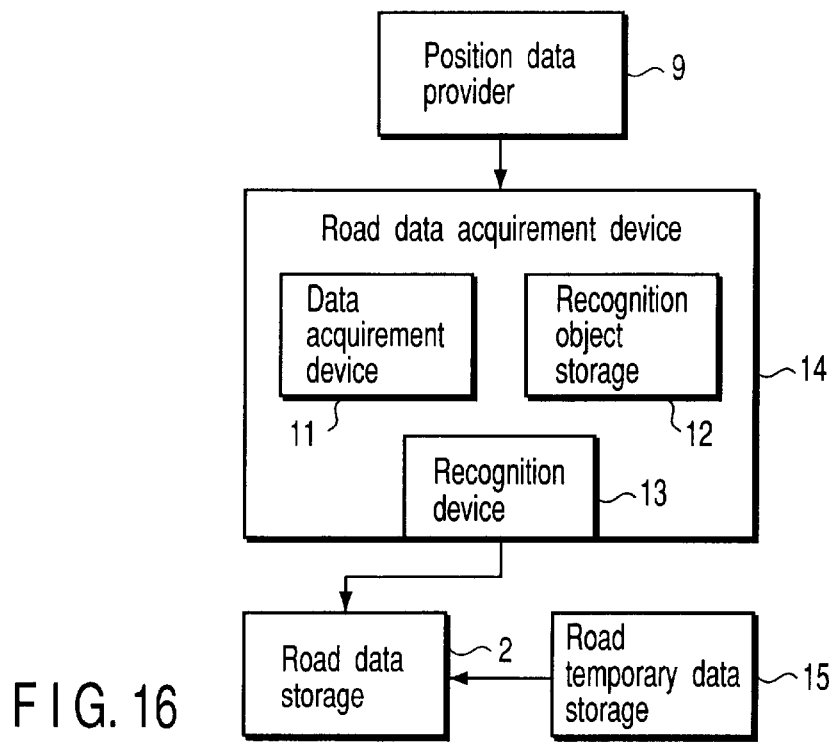
FIGS. 15A and 15B show structure of supplement data acquired in a guidance data collection apparatus of the third embodiment.
FIG. 16 shows a block circuit of a guidance data collection apparatus related to the fourth embodiment.

The recognition result is associated with the position data as shown in FIG. 15 and stored in the supplement data storage 15 (step S1205). The information of FIGS. 15A and 15B expresses recognized data and a pointer to raw data before recognition. Therefore, when the user demands to see the appearance of the elevator, the information can cope with the demand. In other words, when the appearance of the elevator, which must be present, is not known, it is possible to present an image of the elevator in response to the demand of the user. Height of steps can be measured from an original image. That is, the data of steps can be obtained by a measurement process later.

According to the guidance data collection device of the third embodiment, a volunteer or handicapped person can acquire desired supplement data and store them in a database. Therefore, a cost for building up the database can be reduced largely, and data according to the demand of the user can be collected.

(Fourth Embodiment)

The present embodiment changes contents of the recognition object storage 12, that is, storage location as shown in FIG. 16. As a result, it is possible to collect landmark information such as data under construction.

In guidance of the first to the third embodiments, the situation of the landmark and road is not changed till the road data storage 2 is updated. The road data is updated only once a year or once two or three years. However, a shop such as a convenience store is changed to a different shop, the traffic is stopped temporarily by road construction at the end of the fiscal year and so on, or the traffic is stopped by "gas fitting" or "plumbing work" at night. Such a temporary change cannot be coped with in a conventional manner. In contrast, the fourth embodiment collects temporary data by a method similar to the third embodiment. The temporary data is stored temporarily in the road data temporary storage 15.

Figures 17, 18:
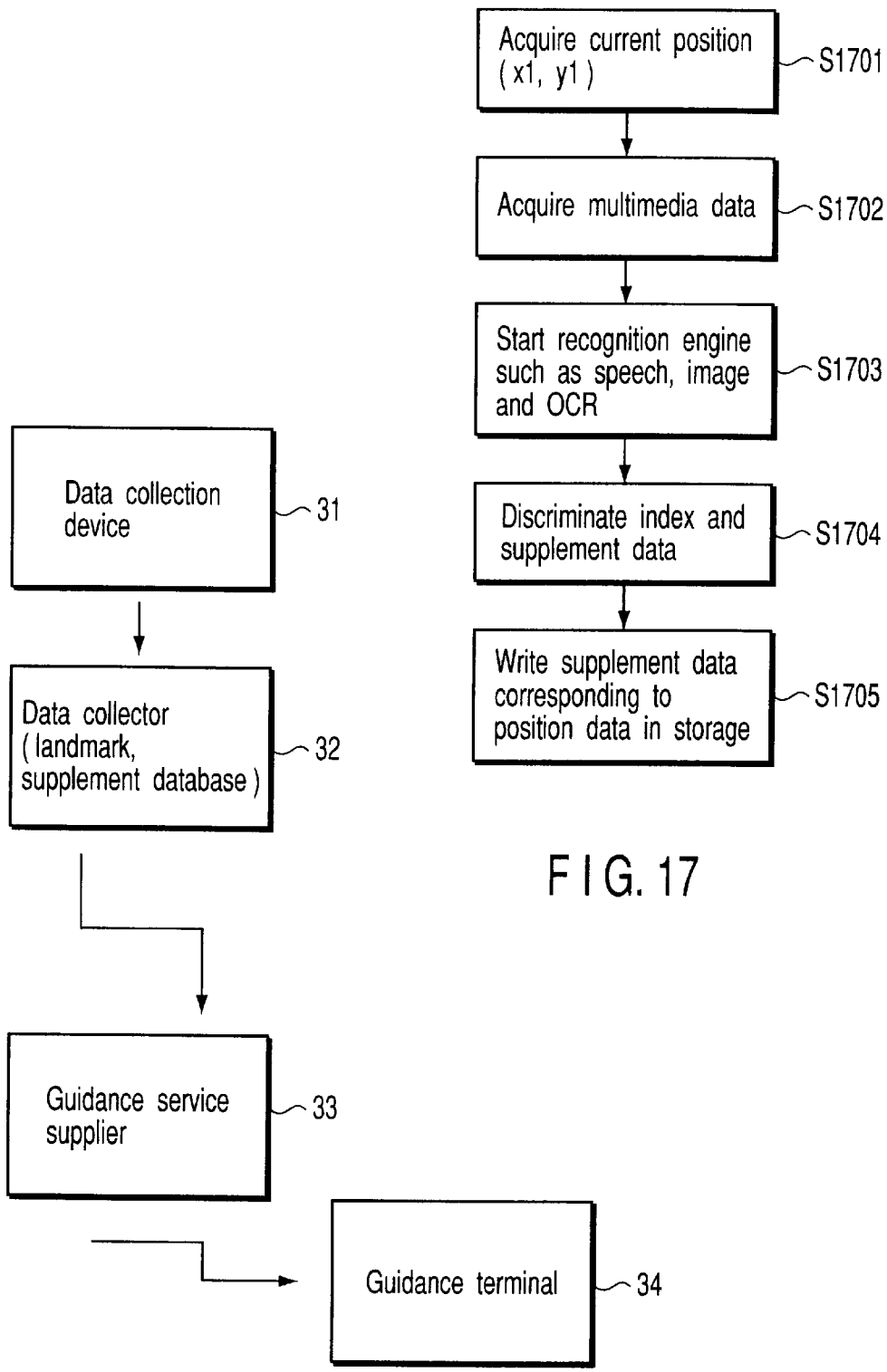
FIG. 17 shows a flow of a process of a guidance data collection apparatus of the fourth embodiment.
FIG. 18 shows a schematic diagram of a guidance data collection/distribution system related to the fifth embodiment.

FIG. 17 shows a flow chart of a process of the guidance data collection device 10 according to the fourth embodiment. The process of the fourth embodiment is approximately similar to a flow of the third embodiment, but it is different from the third embodiment that temporary data such as "change of shop" or "under construction" without the supplement data is recognized in step S1704. Furthermore, it differs from the third embodiment that the acquired data is stored in the road data temporary storage 15 in step S1705. Since the temporary data representing "under construction" can be easily collected, guidance based on the data depending on the situation of the road is enabled.

(Fifth Embodiment)

A guidance data collection/distribution system of the fifth embodiment comprises a data collector 32, a guidance service supplier 33 and a guidance terminal 34. The data collector 32 collects supplement data and temporary data using a data collection device 31 similar to that used in the third and fourth embodiment to build up a database of landmarks and the like necessary for guidance service. The guidance service supplier 33 provides a guidance service. The guidance service supplier 33 may be the same as the data collector 32 or another supplier. The guidance terminal 34 comprises, for example, a cellular phone used by a user in order to enjoy a guidance service really.

As described above, the data collector 32 makes up the database for guidance and delivers the database to the guidance service supplier 33. The guidance service supplier 33 provides the guidance service for a user carrying with the guidance terminal 34 on the basis of the delivered guidance database. Generally, the data collector 32 employs a temporary staff, and makes him carry with the data collection device 31 to collect data. The supplement data and temporary data may be collected from a general user via Internet by paying him the price. The data collector 32 can provide not only a guidance using the collected data, but also a local community paper or a word-of-mouth magazine on a net. Furthermore, The data collector 32 can provide a guide map to house of an individual person.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A walker navigation apparatus for a walker, comprising:
   an input device configured to input a departure location, a destination, and route preferences of the walker;
   road data storage configured to store road data;
   supplemental data storage configured to store supplemental data representing at least one of stairs, an elevator, an escalator, a step, and road width in correspondence with the road data of the road data storage unit;
   a route generator associated with the input device, the road data storage, and the supplemental data storage, and configured to generate an optimum route by calculating a cost of a route for the walker according to the route preferences of the walker and based on the road data and the supplemental data; and
   an output device configured to visually output the optimum route.

2. The apparatus of claim 1, further comprising:
   an attribute input device configured to input an attribute to which a user attaches importance in guidance; and
   a route generation controller configured to change a route cost in the route generator or an optimization calculation in accordance with the attribute to provide the optimum route to the user.

3. The apparatus according to claim 1, wherein the road data storage stores road network data provided by the Geographical Survey Institutes.

4. The apparatus according to claim 1, wherein the output device outputs the optimum route in a human-readable form.

5. The apparatus according to claim 4, wherein the output device outputs the optimum route with at least one of a flashing indication of a route, a color display, a color indication of the route, and an arrow printed material.

6. The apparatus according to claim 1, wherein the route generator calculates the cost of the route based on a length of line segments spanning the route, a road width of the line segments, and a distance from a landmark near the line segments.

7. A walker navigation apparatus for a walker, comprising:
   a user terminal including an input device configured to input a departure location, a destination, and route preferences of the walker, and an output device configured to visually output an optimum route;
   a guidance service server including road data storage configured to store road data, supplemental data storage configured to store supplemental data representing at least one of stairs, an elevator, an escalator, a step, and road width in correspondence with the road data of the road data storage, and a route generator configured to generate the optimum route by calculating a cost of a route for the walker according to the route preferences of the walker and based on the road data and the supplemental data;
   a communication device configured to communicate between the user terminal and the guidance service server to transmit the departure location and the destination from the user terminal to the server, and the optimum route from the server to the user terminal.

8. The apparatus according to claim 7, wherein the guidance service server transmits the optimum route as one of (1) a simple map and (2) a guidance sentence with the simple map and one of text and speech, to the user terminal through the communication device.

9. An apparatus according to claim 8, wherein the user terminal displays the simple map or text on the output device.

10. The apparatus according to claim 7, wherein the user terminal comprises one of a cellular phone and a personal handyphone system.

11. A walker navigation method, comprising:
    inputting a departure location, a destination, and route preferences of a walker;
    storing road data in a storage device;
    storing supplemental data representing at least one of stairs, an elevator, an escalator, a step, and road width in correspondence with the road data in the storage device;
    generating an optimum route by calculating a cost of a route for the walker according to the route preferences of the walker and based on the road data stored in the storage device and the supplemental data stored in the storage device; and
    outputting visually the optimum route.

12. The method according to claim 11, wherein the outputting step outputs the optimum route in a human-readable form.

13. A guidance data collection apparatus, comprising:
    a position data provider configured to output position data by designating a position;
    a supplemental data acquisition device configured to acquire supplemental data, including landmark data representing a landmark as a mark in guidance, and a road state changed temporarily by construction; and
    a storage unit configured to store the position data and the landmark data.

14. The apparatus according to claim 13, wherein the supplemental data acquisition device includes a data acquisition device configured to acquire multimedia data representing a still image, motion image and speech, a recognition object storage unit configured to store recognition object information representing an image to be recognized and an associated key word, and a recognition device configured to recognize the recognition object data based on the multimedia data.

15. The apparatus according to claim 13, wherein the supplemental data acquisition device comprises a data acquisition device mounted on an operator and includes a camera to acquire image data, a microphone to input speech data, and a recognition device configured to recognize the speech data and the image data.

16. A guidance data collection apparatus, comprising:
    a position data provider configured to specify and provide position data;
    a supplemental data acquisition device configured to acquire supplemental data representing at least one of stairs, an elevator, an escalator, and a step; and
    a storage unit configured to store the position data and the supplemental data.

17. The apparatus according to claim 16, wherein the supplemental data acquisition device includes a data acquisition device configured to acquire multimedia data including at least one of a still image, a motion image, and speech, a recognition object storage unit configured to store recognition object information representing an image to be recognized and a key word, and a recognition device configured to recognize the recognition object data based on the multimedia data.

18. A method of collecting guidance data, comprising:
   providing position data by specifying a position;
   acquiring landmark information representing a landmark as a mark in guidance, and a road state changed temporarily by construction; and
   storing the position data and the landmark information in a storage unit.

19. A method of collecting guidance data, comprising:
   providing position data by specifying a position;
   acquiring supplemental data representing at least one of stairs, an elevator, an escalator, and a step; and
   storing the position data and the supplemental data in a storage unit.

20. A walker navigation program stored in a computer readable medium, comprising:
   means for instructing a computer to input a departure location, a destination, and route preferences of a walker;
   means for instructing the computer to store road data in a storage device;
   means for instructing the computer to store supplemental data representing at least one of stairs, an elevator, an escalator, a step, and road width in correspondence with the road data in the storage device;
   means for instructing the computer to generate an optimum route by calculating a cost of a route according to the route preferences of the walker and based on the road data stored in the storage device and the supplemental data stored in the storage device; and
   means for instructing the computer to provide the optimum route in a form desired by a user.

* * * * *